(12) United States Patent
Swanson et al.

(10) Patent No.: US 7,606,759 B2
(45) Date of Patent: Oct. 20, 2009

(54) SYSTEM AND METHOD FOR IMPLEMENTING AN ANONYMOUS TRADING METHOD

(75) Inventors: Steve Swanson, Mt. Pleasant, SC (US); Julian Greim, Charleston, SC (US); Nicholas Stech, Daniel Island, SC (US)

(73) Assignee: Automated Trading Desk, LLC, Mount Pleasant, SC (US)

( * ) Notice: Subject to any disclaimer, the term of this patent is extended or adjusted under 35 U.S.C. 154(b) by 382 days.

(21) Appl. No.: 11/434,942

(22) Filed: May 16, 2006

(65) Prior Publication Data

US 2007/0271169 A1 Nov. 22, 2007

(51) Int. Cl.
G06Q 40/00 (2006.01)

(52) U.S. Cl. .............................. 705/37; 705/35; 705/36

(58) Field of Classification Search ..................... 705/37
See application file for complete search history.

(56) References Cited

U.S. PATENT DOCUMENTS

| | | | |
|---|---|---|---|
| 5,136,501 A * | 8/1992 | Silverman et al. | 705/37 |
| 5,375,055 A * | 12/1994 | Togher et al. | 705/37 |
| 5,689,652 A * | 11/1997 | Lupien et al. | 705/37 |
| 5,950,177 A * | 9/1999 | Lupien et al. | 705/37 |
| 6,012,046 A * | 1/2000 | Lupien et al. | 705/36 R |
| 6,014,627 A * | 1/2000 | Togher et al. | 705/1 |
| 6,098,051 A * | 8/2000 | Lupien et al. | 705/36 R |
| 6,282,521 B1 * | 8/2001 | Howorka | 705/36 R |
| 6,418,419 B1 * | 7/2002 | Nieboer et al. | 705/37 |
| 6,421,653 B1 * | 7/2002 | May | 705/36 R |
| 6,983,259 B1 * | 1/2006 | Foray et al. | 705/37 |
| 6,985,883 B1 * | 1/2006 | Togher et al. | 705/37 |
| 6,996,541 B2 * | 2/2006 | Togher et al. | 705/37 |
| 7,024,386 B1 * | 4/2006 | Mills et al. | 705/37 |
| 7,024,387 B1 * | 4/2006 | Nieboer et al. | 705/37 |
| 7,035,819 B1 | 4/2006 | Gianakouros et al. | |
| 7,184,982 B1 * | 2/2007 | Howorka et al. | 705/37 |
| 7,246,093 B1 * | 7/2007 | Katz | 705/37 |
| 7,333,952 B1 * | 2/2008 | Neyman et al. | 705/37 |
| 7,363,268 B1 * | 4/2008 | Howorka | 705/37 |

(Continued)

OTHER PUBLICATIONS

International Search Report and Written Opinion for Application No. PCT/US07/11673, dated Aug. 25, 2008 (mailing date).

*Primary Examiner*—Jagdish N Patel
*Assistant Examiner*—Sara Chandler
(74) *Attorney, Agent, or Firm*—George T. Marcou; King & Spalding LLP (57) ABSTRACT

A system and appertaining method are provided in which a brokerage firm transmits confidential information about security trading intentions to an anonymous server that follows through on a trade only if there is a likelihood that the trade can be completed. Pricing inputs are obtained that help a price engine determine pricing information for securities. The trade itself is executed by a primary trading system. If the trade is not completed, then the confidential information is not shared with a market maker or other purchasing or selling entity. When security is low and trust is high, for speed purposes, among other things, the anonymous server may be located with a market maker. When security is high and trust is low, any or all of the anonymous server, price engine, and primary trading system can be collocated on site with the broker in a secure environment.

17 Claims, 9 Drawing Sheets

U.S. PATENT DOCUMENTS

| | | |
|---|---|---|
| 7,366,690 B1 * | 4/2008 | Howorka et al. .............. 705/35 |
| 7,383,221 B2 * | 6/2008 | Howorka ..................... 705/37 |
| 2002/0055901 A1 * | 5/2002 | Gianakouros et al. ......... 705/37 |
| 2002/0099641 A1 * | 7/2002 | Mills et al. ................... 705/37 |
| 2002/0099647 A1 * | 7/2002 | Howorka et al. .............. 705/37 |
| 2002/0107781 A1 * | 8/2002 | Neyman et al. ............... 705/37 |
| 2002/0116317 A1 * | 8/2002 | May ........................... 705/37 |
| 2002/0133455 A1 * | 9/2002 | Howorka et al. .............. 705/37 |
| 2003/0014354 A1 * | 1/2003 | Madoff et al. ................. 705/37 |
| 2003/0083973 A1 * | 5/2003 | Horsfall ...................... 705/37 |
| 2003/0093360 A1 * | 5/2003 | May ........................... 705/37 |
| 2004/0034591 A1 * | 2/2004 | Waelbroeck et al. .......... 705/37 |
| 2004/0186806 A1 | 9/2004 | Sinclair et al. ................ 705/37 |
| 2005/0240513 A1 * | 10/2005 | Merold ........................ 705/37 |
| 2005/0283426 A1 * | 12/2005 | Krishnasami et al. ......... 705/37 |
| 2006/0026090 A1 * | 2/2006 | Balabon ...................... 705/37 |
| 2006/0184447 A1 * | 8/2006 | Nieboer et al. ................ 705/37 |
| 2006/0259391 A1 * | 11/2006 | Schoen et al. ................. 705/37 |
| 2007/0005481 A1 * | 1/2007 | Kedia et al. ................... 705/37 |
| 2007/0005484 A1 | 1/2007 | Waelbroeck et al. .......... 705/37 |
| 2007/0038548 A1 * | 2/2007 | Schlifstein et al. ............ 705/37 |
| 2007/0055607 A1 * | 3/2007 | Wunsch et al. ................ 705/37 |
| 2007/0198391 A1 * | 8/2007 | Dreyer et al. ................. 705/37 |
| 2007/0219882 A1 * | 9/2007 | May ........................... 705/35 |

* cited by examiner

SYSTEM AND METHOD FOR IMPLEMENTING AN ANONYMOUS TRADING METHOD

BACKGROUND

Currently, brokerage firms in the financial securities trading business, offer direct securities transactional services through ECNs (electronic communication networks), ATS's (automated trading systems), exchanges, or other brokerage systems, to securities wholesalers often referred to as "market makers". To initiate a transaction, the brokerage firms generally require orders to buy or sell securities to be entered onto their automated system. The orders are then acted on by the brokerage firms either by (1) executing immediately if they are marketable or (2) holding with passive limits until others enter market orders, which allow the orders being held to be executed. Functionally, holding orders with limits imposed gives a brokerage firm an option on whether to take an order or not. This option has value because it effectively gives the brokerage firm a competitive advantage over the market maker.

This is illustrated as follows. Passive order sending firms (or market makers/wholesalers) are forced to put orders or quotes out and the market makers participate against whatever comes. From the market maker's perspective, if the order is a buy order for 1,000 shares, it is very good to have 200 share sell orders that come to hit the quote. But the 200,000 share sell orders are not very good in that they take out the 1,000 shares as well as the next five levels, i.e., the price is distorted in the marketplace. This is a problem for any firm placing limits or quotes into an automated marketplace. This possible scenario forces any firm using limits in an exchange/ECN system to place smaller orders than they might be interesting in taking naturally.

Functionally, placing limit orders into such systems gives the opposing side an option on whether to take ones order or no; that option has value. The present invention flips the situation and permits an option to participate against an incoming market order. The value of the option can belong to the market makers, which is extremely significant and not well understood in today's marketplace.

A transactional practice is needed that would give the market maker the opportunity to share with the brokerage firm the value of the option created by holding with passive limits. That is, the market maker would prefer to see brokerage firms' orders prior to their introduction to the market.

By way of the above example, given the choice prior to the introduction of the 200,000 share sell order, the market maker could decide not to participate, but would participate when given the opportunity to interact with the 200 share sell order. The main issue becomes the brokerage firm does not wish to disclose the fact that a 200,000 share sell order is about to hit the market due to fears of front running, which is defined as an illegal activity in which a trader takes a position in an equity in advance of an action which he/she knows his/her brokerage will take that will move the equity's price in a predictable fashion (also called forward trading). Until now, this limitation has kept such a market or system from being created.

Brokerage firms are concerned that prior information about their security trading intentions given to market makers would be leaked to the general market, which would likely distort the price of the security to be traded. If brokerage firms could anonymously (i.e., without revealing their identity) announce their trading intentions to market makers, they would be willing to do so. Thus, a significant barrier to creating the needed transactional practice has been the lack of anonymity.

SUMMARY

A first aspect of the present invention is a two-stage, virtual auction, automated method for facilitating the trading of securities.

In a first stage, a market maker automatically generates limited pricing data, i.e., inside quotes, inside sizes, etc., for a particular security. The pricing data is electronically transmitted to, and stored in a database residing on one or more of the market maker's servers accessible by a plurality of predetermined securities brokers. The servers are anonymous in that no information regarding any broker making an inquiry on the server is communicated back to the market maker that has posted the pricing data unless an order is generated. In a second stage, a securities broker wishing to trade a security posted on the market maker's server, sends a fill-immediately-or-cancel (IOC) order to the market maker. The market maker server will either reject or conditionally accept the order. If the order is rejected, no information regarding the broker's order is transmitted to the market maker. If the order is conditionally accepted, the order is routed to the market maker's order handling system. Because the order has been pre-qualified, such an order has a high probability of being filled by the market maker.

Alternatively, in the first stage, a securities broker can send an electronic message to a specified server of the market maker expressing an interest in trading a particular quantity of a certain security at a particular price. In response, the server is programmed to generate and transmit to the securities broker an acceptance or rejection of the securities broker's interest (i.e., an order from the market maker to the securities broker) based on the pricing data on the market maker's server.

In a second embodiment of the first aspect, a server of the market maker is collocated with each automated trading system of one or more securities brokers. In a variation of this embodiment, the market maker's mechanism for automatically generating pricing data is also collocated with an automated trading system of one or more securities brokers.

In a third embodiment of the first aspect, all elements of the market maker's system are collocated with the security broker, with the exception of the market maker's risk management system.

A second aspect is a computer system, including hardware and software, to carry out the method of the first aspect.

Accordingly, a method is provided for facilitating automated securities trading comprising: a) providing, by a first party, to an anonymous server that is anonymously accessible to automated systems of one or more second parties, information on price and quantity of a security which allows the first party to make determinative predictions about whether to accept or reject an order; b) automatically communicating an order (IOC) or indication of interest (IOI) from a second party to the first party to trade the security by an automated system of the second party connected to the anonymous server, wherein the anonymous server initially preserves the identity of the second party; and c) responding, by the first party, to the order or IOI by at least one of: 1) executing the order and indicating acceptance of the order to the second party; 2) rejecting the order or IOI; and 3) accepting the IOI.

Additionally, a method is provided for facilitating automated securities trading comprising the steps of: a) anonymously communicating, by a second party, to an anonymous server of a first party pricing and quantity information of a security for which the second party is interested in trading; b) generating, by the anonymous server, pricing data at which the first party is willing to trade the security; c) comparing pricing information from the second party with the pricing data generated by the anonymous server; d) if the pricing information of interest to the second party is within a predetermined range of the pricing data generated by the anonymous server, then converting the second party's pricing information into an order for the security, and informing the second party of conversation of its communication/pricing information to the order; e) at the option of the second party; 1) directly communicating the order to the primary trading system (116) of the first party (109) for execution, or 2) waiting for the second party to communicate the order to the primary trading system of the first party; and f) executing the order by the primary trading system of the first party according to the second party's option if acceptable to the first party.

Finally, a system is provided for facilitating automated securities trading comprising: a first computer element that is a system or software module that predicts price data of certain securities based on predetermined selected types of pricing input, at which a first party controlling the first computer element is interested in buying or selling a predetermined amount of the securities, the first computer element having an output; a second computer element that is a system or software module configured as an anonymous server to store and distribute data communicated via an input to it by the first computer via its output via a communication link; a third computer element, which is controlled by a second party and programmed to: a) periodically communicate with and query the data stored in the server for securities the second party is interested in trading with the first party; and b) when securities information is found that relates to securities both the first and second parties are interested in trading, the third computer communicates an offer to trade the securities to the first party; and a fourth computer element controlled by the first party that is programmed to execute the offer to trade offered by the second party.

DEFINITIONS

The following definitions are used for the appertaining terms in this specification.

The term "broker," means a person or entity that represents other persons or entity, and acts on their behalf, as their agents, in business related negotiations and transactions. This term encompasses its ordinary meaning as well as its definition under federal securities laws and includes a bank, attorney-in-fact, or any other person or entity acting in the capacity of a broker. As used herein, the term "dealer" is synonymous with "broker." A "brokerage firm" is an entity that functions as a broker, and as used herein, includes institutional investment firms such as insurance companies, mutual fund houses, and the like. As used herein, a "broker" includes an entity or person when trading for its own account as well as when trading for the account of others.

As used here in, the term "firm" means a business entity engaged in dealing in financial securities or providing financial services.

The term "market maker" means a securities trader that is responsible for maintaining a fair and orderly market. As used herein, this term is generally synonymous with the terms "wholesaler" and "wholesale securities trader."

As used herein, "marketable" means an order which is immediately executable by its terms.

In reference to an order, the abbreviation "IOC" means "immediate or cancel."

As used herein, an "order" means an electronic order for purchase or sale of securities typically issued on an IOC basis.

The term "market order" means an order to buy or sell at the current market price.

"Limit order" means an order to buy or sell at a certain price. It is executed when the market moves to that price.

The term "executed" in regards to an order means the securities have been bought or sold with respect to the parties to the order.

In regards to an order, "filled" means fully executed.

The term "securities" means stocks, bonds, commodity futures, currency, and certificates representing any of the foregoing, and other security or financial instruments capable of being traded in the manner contemplated by this method.

A "security exchange" means a physical or virtual market for trading one or more categories of securities. As used herein, this term includes not only well known organizations such as the New York Stock Exchange but cyberspace entities as well. Security exchanges specializing in financial instruments are referred to herein as "financial markets."

"Indication of Interest (IOI)" is an electronic message sent by a broker to a market maker's electronic trading system (or any component or subsystem thereof or associated therewith, such as a server) expressing an interest in trading a particular quantity of a certain security at a particular price. The act of sending an IOI is referred to as "pinging" the server.

As used herein, the term "system" means a "computer system" and includes all the hardware, software, and communications links associated with such system.

A "server" is a computer, or computer system, capable of interaction with other computers, or computer systems.

A "collocated process" in is an operation carried out by one party's computer hardware and software that is in the physical domain of another party.

The present invention allows for brokerage firms to save trading costs and prevent information leakage. For example, if a brokerage firm routes a market order to a securities market, e.g., The New York Stock Exchange, for execution, it will have to pay for the execution Moreover, the act of sending the order to a financial market may give away information regarding the brokerage firm's trading strategy. On the other hand, if it routes the order directly to a third party for execution, there is always the possibility of information leakage.

The provision of anonymity as to the identity of the securities broker is an important feature of the present invention. A securities broker may wish to trade such a large amount of a security that advance knowledge of the broker's intent might distort the market. If, for example, a broker has a customer who wishes to sell its holdings of twenty percent of the outstanding shares of the XYZ Corporation, any advanced word of such a proposed sale could profoundly suppress the price of shares of XYZ before the broker could complete the sale. However, if the broker could anonymously shop around and find suitable buyers, it could execute the sale for the customer without the securities trading community becoming aware of the pending transaction.

It is highly preferred, but not essential, that the method of the present invention works with computerized automation because the extremely short required response time is preferably on the order of milliseconds. Further, a human acting as an intermediary could possibly leak information, thereby losing anonymity—it would be very difficult to verify that information would not be leaked and anonymity would not be maintained.

BRIEF DESCRIPTION OF THE DRAWINGS

The invention is explained below with reference to various embodiments of the invention shown in the drawings and described below.

DETAILED DESCRIPTION OF THE PREFERRED EMBODIMENTS

In a broad sense, there are at least three separate embodiments that are presented, although other embodiments are also contemplated by the invention. These three embodiments, broadly speaking (and all illustrated in FIG. 1), are:

1. first embodiment: (see also FIG. 4A) the broker 103 sends an IOI 310 to the market maker's 109 anonymous server 108, the market maker 109 sends an IOC (order) 320 to the broker 103, and the broker 103 responds with an order confirmation 380 or rejection 390;
2. second embodiment: (see also FIG. 4B) similar to embodiment 1, the broker 103 sends an IOI 310 to the market maker's 109 anonymous server 108, the server 108 sends an IOI acceptance (conditional order acceptance) 314 to the broker 103, and the broker 103 initiates the IOC (order) 320, where the market maker 109 responds with an order confirmation 380 or rejection 390;
3. third embodiment: (see also FIG. 4C), the broker 103 sends an IOC (order) 320 to the anonymous server 108 directly, and the market maker 109 responds with an acceptance 380 or rejection 390 of the order 320.

These and other embodiments may also be configured in variations that address, among other things, the degree of security desired by the broker 103 with respect to communicating information to the market maker 109.

In one variation, (illustrated by FIG. 1), the anonymous server 108 and price engine 104 are located remotely from the broker's 103 system 110. This provides the broker 103 with the least amount of security since it provides its indication of interest IOI 310 openly to the market maker 109 and relies on the trustworthiness of the market maker 109 to not improperly use the information contained within the IOI 310 to its advantage. Although this is less secure from the broker's 103 perspective, such a configuration has the advantage of speed from the market maker's 109 system in that the communications and handshaking required between the server 108, price engine 104, and primary trading system 116 are much faster if located near each other and, optimally, within the same local area network.

Figure 2A:
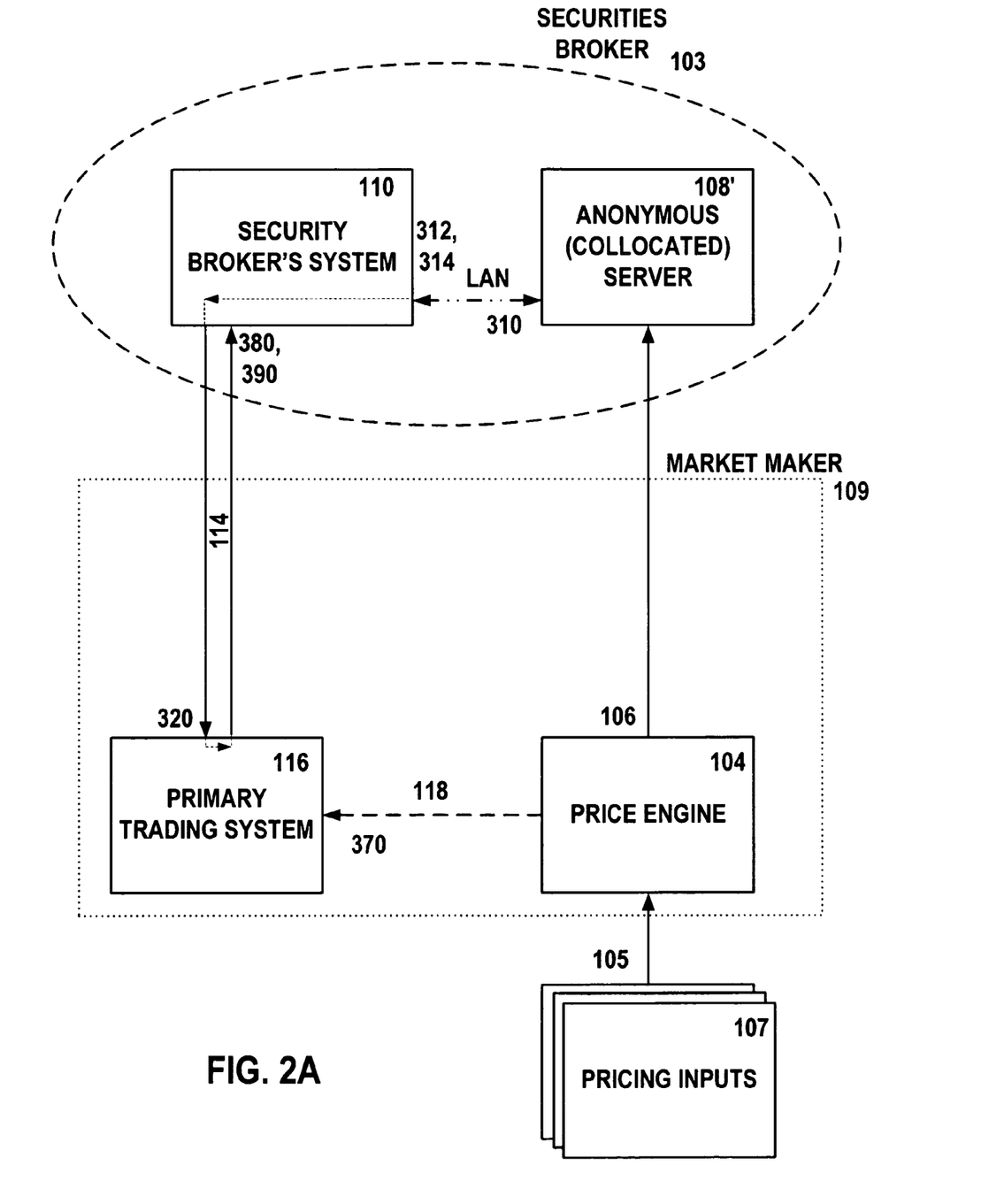
FIG. 2A is a flowchart schematically illustrating flow of data in an alternative embodiment of the present invention in which the anonymous server is collocated with the broker's system.

However, as illustrated in FIG. 2A, when the broker 103 requires a more secure configuration, the anonymous server 108' may be collocated with the broker's security system 110, where security may be provided by, e.g., a firewall or other mechanism for monitoring and controlling external access. As FIG. 2A illustrates, the broker can prevent the server 108' from conveying information back to the market maker 109, while permitting the necessary or desired inputs over the communication link 106.

Figure 2B:
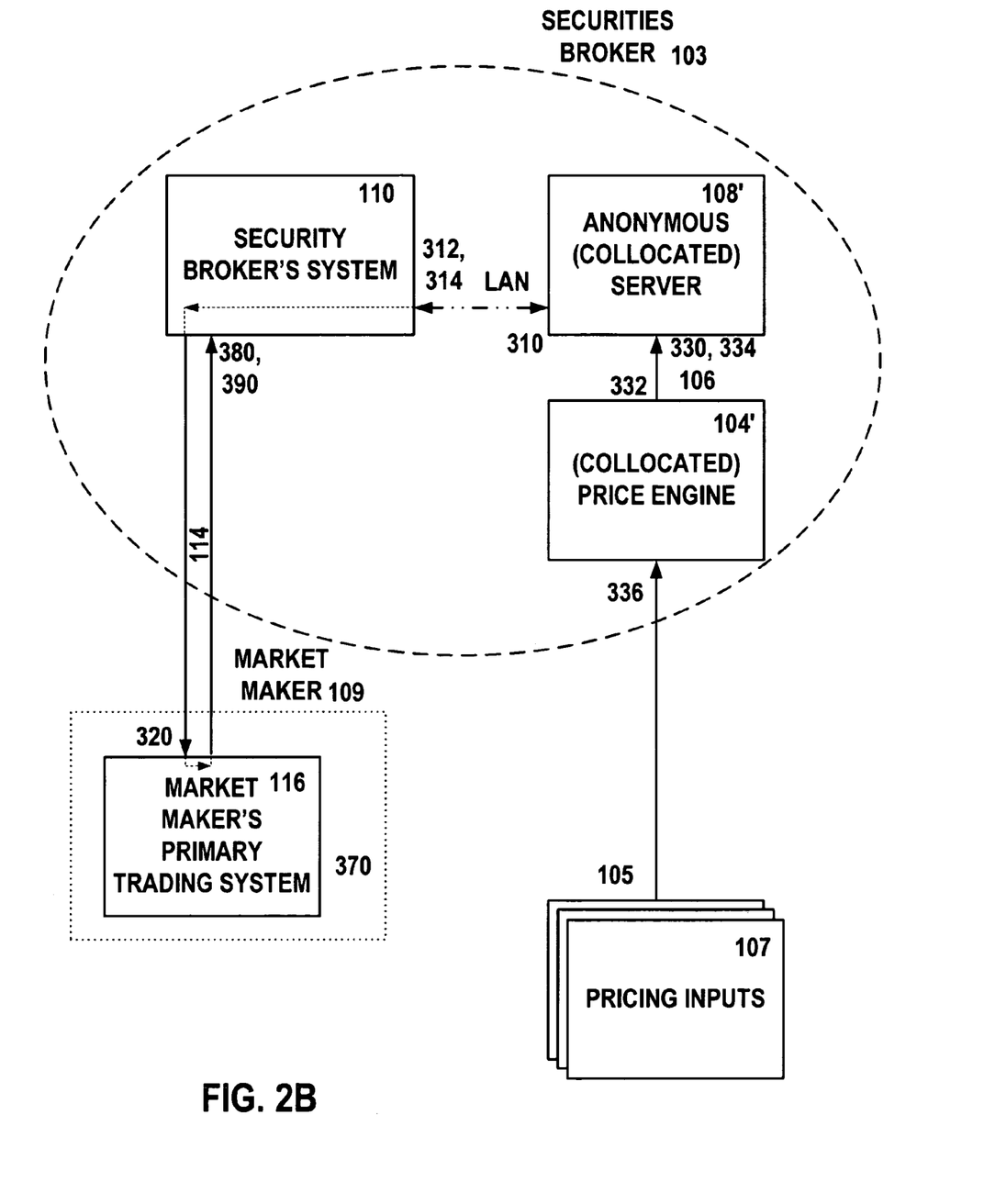
FIG. 2B is a flowchart schematically illustrating an embodiment similar to that shown in FIG. 2a wherein the price engine is also collocated with the broker's system.

FIG. 2B is very similar to FIG. 2A with the exception that the price engine 104' is also collocated with the security broker's system 110, thereby permitting greater control by the broker 103.

Note that any of the embodiments discussed above may be implemented with any of the variants discussed above, however, from a practical standpoint, certain embodiments are better suited than others to certain variants. For example, it would lose some of the benefit of security if the anonymous server 108' were collocated with the broker's system 110, and yet the anonymous server 108' still initiated direct communication with the market maker's primary trading system 116, since this would create the communication of information in a manner in which it could be misused (which conflicts with the reason for collocating the anonymous server 108' with the broker's system 110).

Figure 1:
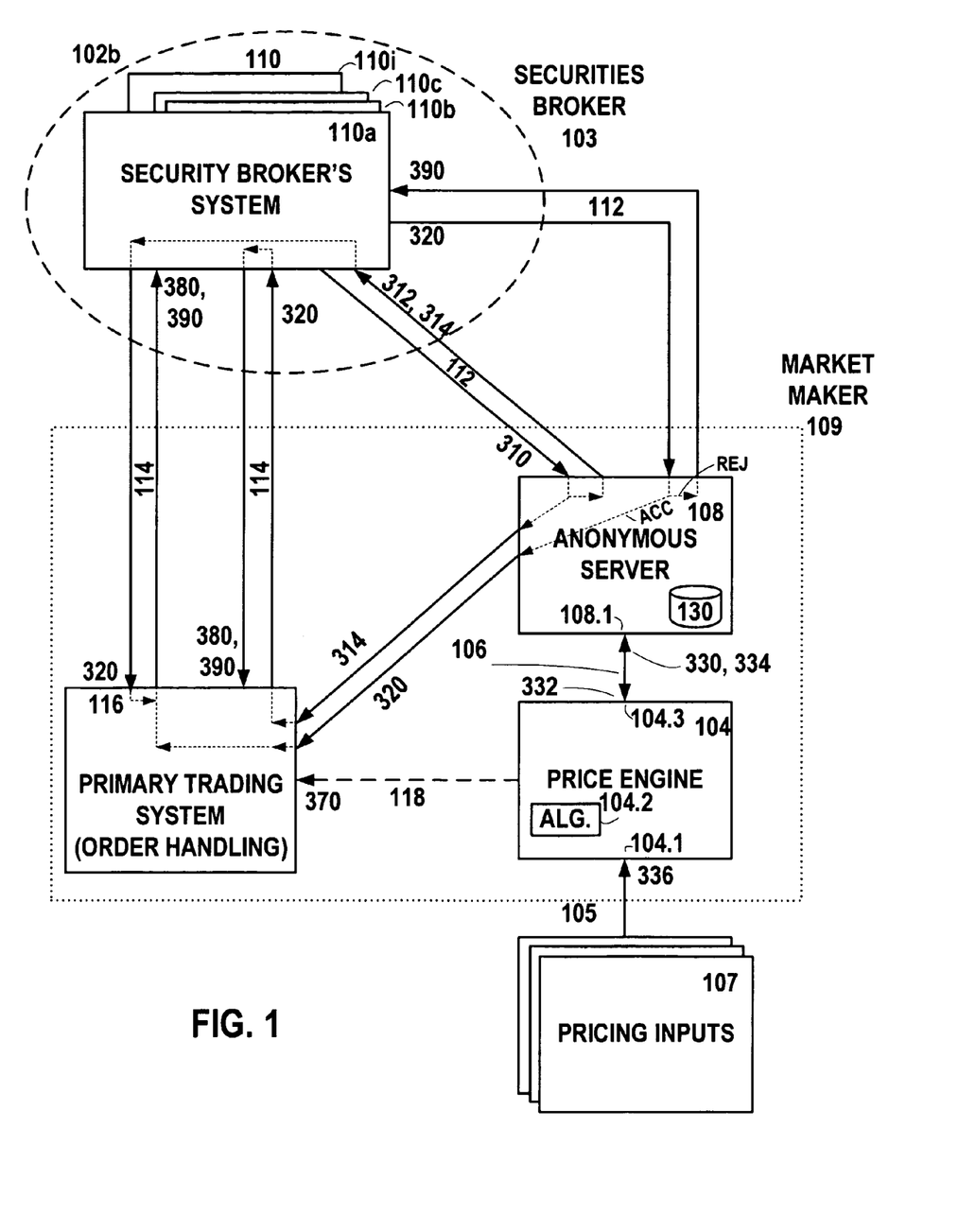
FIG. 1 is a flowchart schematically illustrating the present invention in an embodiment in which the anonymous server is located remote from the broker's system.

FIGS. 2A and 2B do not show all of the embodiments present, nor all of the elements of FIG. 1 for the sake of simplicity—however, it is to be understood that these elements and embodiments may be present in the architectures illustrated in FIGS. 2A and 2B.

Figure 2C:
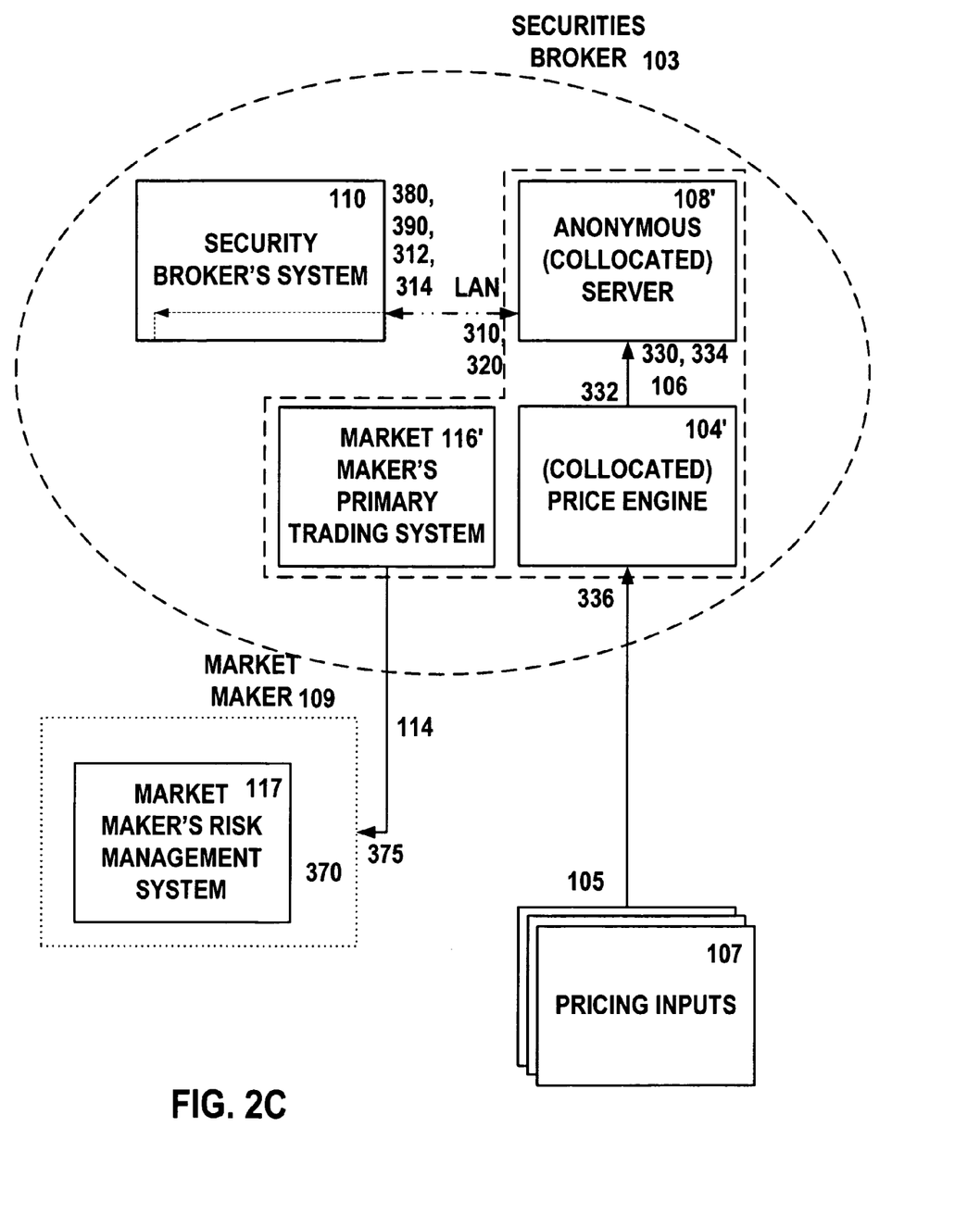
FIG. 2C is a flowchart schematically illustrating an embodiment similar to that shown in FIG. 2b wherein the market maker's primary trading system is also collocated with the broker's system.

FIG. 2C illustrates a most secure system from the standpoint of the broker 103 in that even the market maker's primary trading system 116' is collocated with the broker's system 110. In this scenario, the only link back from the security broker 103 to the market maker 109 is information related to inventory management (messages) 375 over the communication link 114 to a risk management system 117 of the market maker 109. Note that the risk management system 117 is present in all embodiments and relates to internal compliance and regulatory watchdog functions—it ensures that all trading rules are complied with (e.g., Manning, short sale, etc.) and involves elements that are known to one of ordinary skill in the art.

General Networking

Examining the elements in more detail, a market maker's 109 place of business and a securities broker's 103 (e.g., a regional, national, or international brokerage firm or an institutional trader) place of business, may be any place in the world that has high speed telecommunications. Because the present invention relates to interaction of computer systems through the global telecommunication network, there is no requirement that the places of business be in physical proximity to major financial markets. Furthermore, differences in time zones of the interacting parties are irrelevant. For example, a market maker's offices might be in South Carolina and yet it can easily interact with brokerage firms and institutional traders in New York, London, Tokyo or anywhere else. Thus, the present invention is applicable to both domestic and international securities transactions.

Security Pricing Data The price engine 104 of the market maker 109, generally performs calculations regarding the pricing of various securities based on pricing inputs 107, and is provided via price data generation software installed on a computer system capable of running such software to form a price generation system. The price engine 104 utilizes market data 336 from pricing inputs 107, which can include, but is not limited to: a) recent market price history of a particular security, e.g., common stock; b) a quantity of that security controlled by or of interest to the market maker 109; c) present and projected market conditions; and d) other economic factors and conditions chosen by the market maker 109. The price engine 104 subjects the input data 107 to the operation of a pricing algorithm 104.2 to generate a price at which the market maker 109 is willing to trade a given quantity of the particular security.

The pricing algorithm 104.2 may be embodied in proprietary price generation software 104 developed by, or exclusively for, the market maker 109. However, it is also possible to purchase or license commercially available pricing software. The market maker 109 may use this software "out-of-the-box" or modify it to meet its particular requirements. Pricing software could include price prediction software that is produced by, for example: DeepInsight Products (www.deepinsight.com), DeepInsight Version 9.6, RT Pro Edition and Alyuda Research (www.tradecision.com), Tradecision Professional Real Time. Pricing inputs 107 that may include market history, current market activity, and other relevant market and economic data may be obtained in electronic format in "real time," through subscriptions to commercial information providers through one or more data links 105 connected to an input 104.1 of the price engine 104.

The rate at which pricing engine 104 updates the price of a particular security is dependent on the market input data 336, which in turn reflects the volatility of that particular security. For a hyper-volatile security, updating could be as frequent as several times a second. On the other hand, for a very stable security, the price might not be updated for several minutes.

In theory, a human skilled in the art of security market analysis could perform the function of price engine 104. However, the speed required by the method of the present inventions dictates that price engine 104 be run on a high performance computer and associated software capable of obtaining input data 336, operating upon that data, and communicating the results to other computer systems in a small fraction of a second. For example, on the order of milliseconds, the price engine 104 might determine that the market maker 109 is interested in selling 1,000 shares of stock in the XYZ Corporation for price, P1 or buying 1,000 shares for a price, P2.

Anonymous Server Communication Architecture

Utilizing a communication link 106, the price engine 104 communicates limited price and quantity securities information, i.e., security pricing data 330, from its output 104.3 to a security pricing data input 108.1 of an anonymous server 108 that may be accessed by a securities broker's system 110. The security pricing data 330 may be stored in a database 130 of the anonymous server 108. Note that the anonymous server 108 is not "posting" orders for execution because the present invention relates to a virtual auction system rather than a virtual ECN system.

For ease of illustration in FIG. 1, only one securities broker's system 110a is depicted as communicating with the anonymous server 108. However, it is to be understood that a plurality of independent securities brokers' systems (110a-i, collectively 110) may simultaneously communicate with, and access data from, the anonymous server 108 via multiple, parallel communication links substantially the same as a broker-anonymous server communication link 112. This communication link 112 may be any way of connecting computers over a substantial distance, such as dedicated communication lines or broad band Internet conduits as part of a wide area network (WAN).

Note that while the securities broker's system 110 may access the security pricing data 330 stored in the securities pricing database 130 which is located in the anonymous server 108, the market maker 109 that posted the data 330 receives no information from the server 108 concerning which or how many securities brokers 110 have accessed the pricing data 330 in the database 130. That is, in the first instance, the securities broker 110 is anonymous with respect to the price posting market maker 109.

Anonymous Server Process Embodiments

As illustrated in FIG. 1, a securities broker 103 with order instructions from a customer to trade a certain quantity of a security at a particular price may, in one embodiment, communicate the IOC order 320 with the market maker 109 via access to the anonymous server 108 through the broker-anonymous server communication link 112. If the anonymous server 108 rejects 390 the order 320, based on the price data 330 in the database 130, and, obviously, the inventory in order to be able to fill the order, the securities broker 103 can fill the customer's needs by placing an order through a general market, such as one of the security exchanges. If, however, the anonymous server 108 can accept the order 320, it can then forward the order 320 on to the primary trading system 116 for either actual execution of the order 320 with response of order confirmation/acceptance 380 (if possible), or order rejection 390 (if not possible). Advantageously, in this embodiment, the security broker's system requires little or no modification to communicate the IOC order 320 to the anonymous server 108.

However, in an alternate embodiment, the anonymous server 108 may be programmed to receive and respond to an indication or interest (also "quasi order") 310 from a securities broker 103 in the form of an indication of interest (IOI) 310. If the price engine 104 determines that the interest conveyed in the IOI 310 of the securities broker 103 is within a range acceptable to the market maker 109, and sufficient inventory is present, the anonymous server 108 will accept 314 the broker's IOI 310. Otherwise, the broker 103 will be notified that the IOI 310 is rejected 312.

At the option of the market maker 109, the server 108 can be programmed to ask, via a counter offer pricing request 332, the price engine 104 to generate a counter offer 334 and communicate the counter offer, via a transaction 352, to the broker 103. Note that the offer-counteroffer cycle can repeat when the rounds occur quickly enough (e.g., on the order of a few milliseconds) and within the boundaries of some agreed-upon predetermined parameters.

If the market maker's 109 price data 330 does match the customer's order 320 or the server 108 accepts the IOI 310, as discussed above, and the inventories are satisfactory, the securities broker's system 110 can execute the second stage of the present method by sending a trade execution order IOC 320 directly via a broker-trading system communication link 114 to the primary trading system 116 of the market maker 109. Note that the computer system hosting the price engine 104 had previously transmitted by way of the price-engine-trading system communication link 118 a copy 370 of the information 330 sent to the anonymous server 108. Typically, such an order 320 from a broker 103 would be on an immediate or cancel (IOC) basis often referred to as "fill-or-kill" order. That is, if the order 320 could not be filled immediately, it would be cancelled. Because a securities broker 103 knows the market maker's 109 interest beforehand, there is a very high probability that the order 320 will be filled. A confirmation and acceptance 380 of the order 320 is provided from the primary trading system 116 to the securities broker's system 110.

As FIG. 1 illustrates, the system can be configured such that the anonymous server 108 responds positively to the IOI 310 directly to the server with an IOI acceptance 314, in which case the broker's system 110 communicates the IOC order 320 to the primary trading system 116, which responds with an order acceptance 380 or rejection 390, or, alternatively, the anonymous server could communicate the IOI acceptance 314 directly to the primary trading system 116, which then initiates the IOC order 320 itself to the broker's system 110 and receives acceptance 380 or rejection 390 of the order 320.

Although it is possible that an IOI 310 that has been accepted 314 could potentially result in a rejected order 390, such occurrences should be fairly infrequent. The brokers 103 and market makers 109 could agree on any arbitrary rejection rate as acceptable, (e.g., a 40% rejection rate in a fairly liberal construction). However, a high rejection rate could potentially suggest that the information provided in the broker's 103 requests 310 (that have been accepted 314 and then subsequently rejected 390 when the actual order is attempted) is being improperly used to the advantage of the market maker 109 and thereby defeat the primary purpose of this configuration. Therefore, the brokers 103 may require a much smaller rejection rate.

Collocated Server

FIG. 2A schematically depicts an alternative configuration of the present invention. The anonymous collocated server 108' may be collocated with, and connected to, e.g., by a local area network (LAN) or other direct network connection, the automated trading system hardware 110 of one or more securities brokers 103 at the security broker's place of business. For simplicity of illustration, FIG. 2A focuses on a single securities broker 103, but the method clearly can be applied to include other securities brokers 103 as well. For example, an anonymous collocated server 108' might be collocated with each of several securities brokers 103.

Such a direct connection between the anonymous collocated server 108' and the securities broker's system 110 significantly reduces the response time between the server 108' and broker's system 110, but can increase the access time to the non-collocated (remote) price engine 104. Note that although the collocated anonymous server is identified by reference character 108' in the figures, where it makes sense, the anonymous server may be referred to herein generally by reference character 108 to mean either a collocated server 108' or a non-collocated (remote) server 108.

As mentioned previously, the collocated server 108' provided by the market maker 109 ideally does not communicate broker 103 information to the market maker 109 (in a possible variant of the invention, it would not communicate with the broker 103 unless it intends to meet an order-this configuration requires more trust on the part of the broker 103). However, if the anonymous server 108 is anywhere but within the site of the securities broker 103, trust is required on the part of the broker 103 that the anonymous server 108 does not, in fact, convey information to the market maker 109 prior to accepting 380 or conditionally accepting 314 an order 310, 320. In other words, the anonymous server 108 knows privileged information that it is not supposed to convey for some part of the transaction cycle. It might be possible for an unscrupulous market maker 109 to transmit such sensitive knowledge provided by the broker 103 back to the market maker 109 via the anonymous server 108 prior to accepting or confirming an offer. Thus, by collocating the anonymous server 108' at the site of the securities broker 103, it is possible that the broker 103 can, via a firewall or other known security measures, block improper communications from going back to the market maker 109 and thereby create an additional sense of security on the part of the broker 103.

Within the scope of the present invention, the price engine 104 in connection with the anonymous server 108 can be programmed to provide custom pricing to the securities broker's system 110 with which it is collocated. For example, the price engine 104 generates price data 330 in response to an inquiry 320 from a securities broker 103, and not generated a priori and stored on anonymous server 108.

In summary, prior to sending an order 320 to the general market, the securities broker 103 can query or "ping" the collocated server 108' with a quasi-order (IOI) 310 via its LAN. If the market maker 109 decides not to fill the order requested in the quasi-order 310, the securities broker 103 receives a rejection 312 within a time frame on the order of milliseconds. However, if the market maker 109 believes it is highly likely to fill the order 310 it can indicate this to the broker's system 110 via an acceptance of the IOI 314. In this case, the broker's system can initiate the order 320 to the primary trading system 116, or, in a less secure manner, the order 320 or acceptance of IOI 314 can be automatically sent from the collocated server 108' to the primary trading system 116 of the market maker 109 via the collocated server-primary trading system communication link (not shown).

Again, from a not-so-secure standpoint, the broker's system 110 could send an actual order IOC 320 to the collocated server 108' and things could be handled in a manner described above with respect to FIG. 1.

As noted above, if a securities broker 103 is concerned about data leakage, it can require that it be informed of acceptance 314 and that nothing from the marker maker's collocated server 108' be sent back to market maker's primary system 116 (akin to a one-way valve). The securities broker 103 would then send the orders 320 for execution directly to the market maker's 109 primary trading system 116 via communication link 114.

FIG. 2B depicts an embodiment variation to that shown in FIG. 2A and described above. In this variation, both the anonymous server 108' and the price engine 104' are collocated with a securities broker 103. In practice, the price engine 104' may be hosted by the anonymous collocated server 108'. For simplicity of illustration, only the securities broker's system 110 is depicted in FIG. 2B. However, such a combination of collocated server 108' and price engine 104' could be collocated with the systems of multiple securities brokers 103 in a similar manner explained in the description of FIG. 2A. This combination collocation both reduces response time and minimizes disruptions that might occur in long distance telecommunication links. However, each of the price engines 104' must be fed identical market and pricing data 336 from the pricing inputs 107, and each must communicate the pricing data 336 it generates to the primary trading system 116 via the link 118.

FIG. 2C illustrates an embodiment variation to that shown in FIGS. 2A and 2B. In this system, even the market maker's primary trading system 106' is collocated with the security broker's system 110 and can be surrounded by a firewall or other protective mechanism by the securities broker 103. As noted above, any combination of the primary trading system 116', the price engine 104' and the anonymous server 108' could be run within the same physical system or could be run on separate interconnected devices. The only communication back to the market maker 109 is data related to inventory, e.g., an inventory management message 375 to the market maker's risk management system in order to comply with internal compliance and regulatory watchdog aspects of the business.

Method

Figure 3:
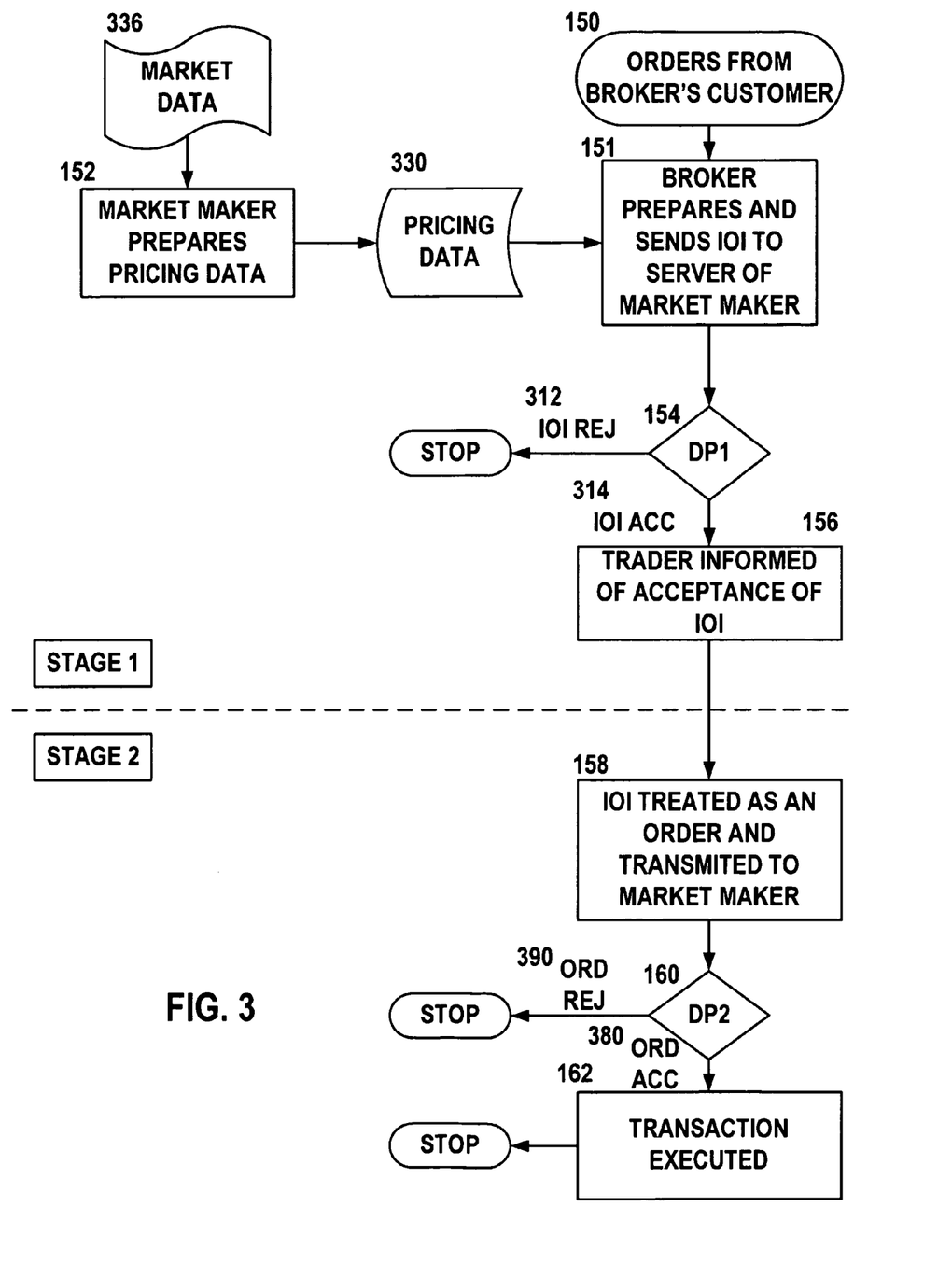
FIG. 3 is a flowchart schematically illustrating a flow according to an embodiment of the present invention.

One of the IOI-initiated embodiments of the invention is illustrated by way of a flow chart as seen in FIG. 3, although it would be clear as to how to extrapolate the operation to cover the alternate embodiments. Referring to FIG. 3 (and referring to reference characters from the previous Figures), and for the IOI-initiated variation, the method is implemented as a two-stage process. In the first stage, an order is received by its customer 150, and then, at step 151, the broker 103 prepares an IOI 310 and sends it to the anonymous server 108 of the market maker 109. Prior to this, in a step 152, the market maker 109 has prepared pricing data for the security of interest 330 from market data 336.

Note that a process 152 is carried out by the price engine 104 in FIG. 1 that receives the market data 336. The server 108 may pre-accept 314 or reject 312 the IOI 310 at a decision point 1 (DP1) 154, based on pricing data 330 and available inventory. A rejection 312 immediately halts the process. However, if the IOI 310 is accepted 314, the securities broker 103 is informed in a process 156, and the broker 103 may transmit an IOC order 320 in a process 158 directly to the market maker's 109 primary trading system 116.

Alternatively, if the securities broker 103 is concerned about information leakage, the broker 103 can require that nothing be transmitted automatically and place its order 320 with the market maker 109 in a discrete step.

Whether automatically or by a discrete step, when an order 320 based on an accepted 314 IOI 310 is received by the market maker's 109 primary trading system 116, the order 320 is rejected 390 or accepted 380 at decision point 2 (DP2) 160. Upon acceptance 380, the transaction is executed in process 162, and the present method is completed. Rejection 390 at DP2 160 is generally rare because the of the pre-acceptance at DP1 154 in this embodiment. The distinct two stages of the present trading method can be clearly seen in FIG. 3. In Stage 1, the part of the flow chart above the dashed line is fully automated and securities brokers 103 pinging the server 108 are anonymous. Stage 2 is also automated and proceeds smoothly because of the preliminary activities in Stage 1.

When collocated, a computer subsystem, such as a collocated server 108', generally communicates with a host computer system 110 by way of a direct communication link. Typically, such a link will be a local area network (LAN) or functionally similar arrangement. In the embodiments discussed herein, communication links 105, 106, 112, 114, 118 and 120 are preferably dedicated communication conduits such as microwave, satellite, wire, and optical fiber. However, these links may also be through common conduits or broad band Internet or any other know wide-area network architecture.

FIRST-EMBODIMENT EXAMPLE

Figure 4A:
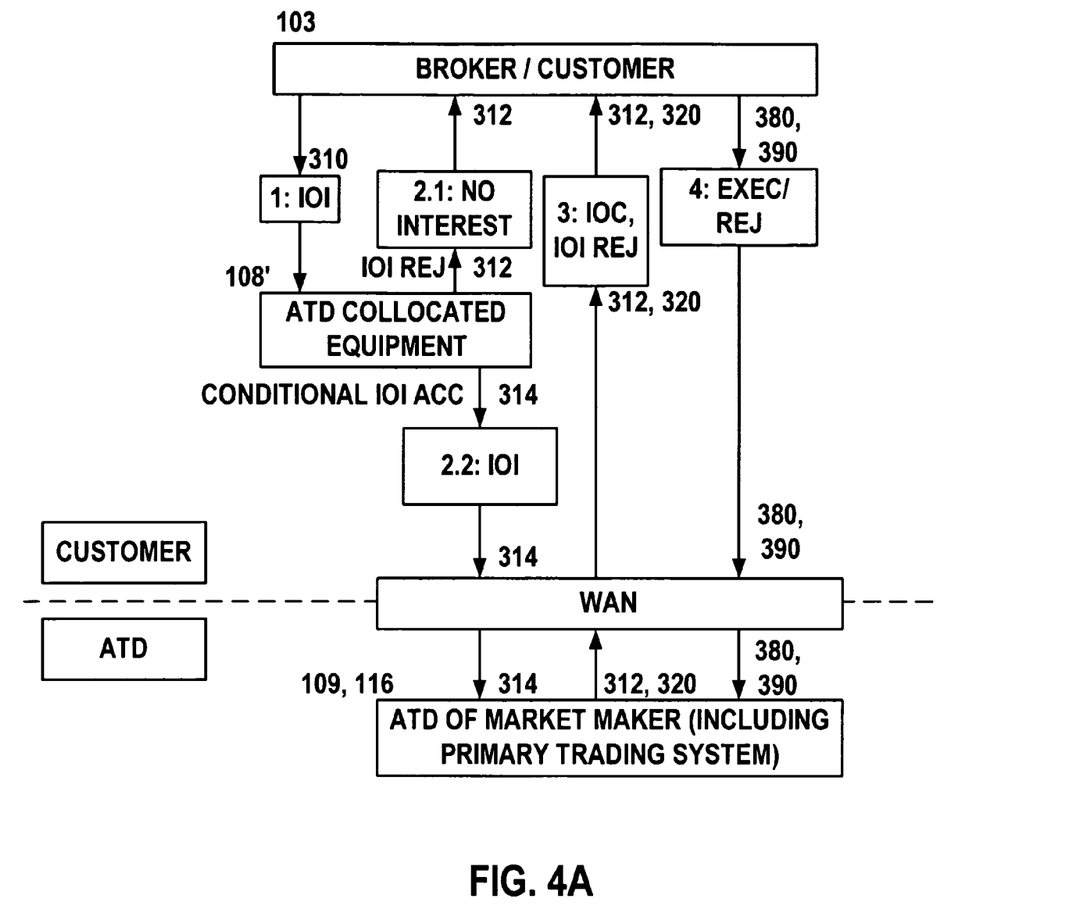
FIG. 4A is a CTCI-High level diagram that schematically shows a WAN level analysis for a market maker IOC version of the method of an embodiment of the present invention.

FIG. 4A is a computer-to-computer (CTCI)-high level block diagram that shows a WAN level analysis of a transaction flow for an embodiment of the method of the present invention (in the architecture utilizing collocated equipment). Here, (1:) a securities broker 103 "pings", e.g., the collocated server 108' with an IOI 310, and (2.1:) receives an immediate rejection (either a direct reject (2.1:) 312 or an IOC order for zero shares (3:) 320).

If the collocated server 108' determines the market maker's 109 automated/primary trading system 116, will likely accept an order based on the content of the IOI 310, a conditional acceptance 314 of the IOI 310 message is routed (2.2:) to the automated trading desk ATD, which includes the primary trading system 116 of the market maker 109, (4:) to either reject (rarely, again a direct reject 390) or an IOC order 320 for zero shares (a technique that can be used in place of any reject situation)), or (3:) respond with an IOC order 320 to the broker 103 for the number of shares wanted. The rejection may also occur as a rejection of the IOI 312. If too much time has elapsed, or if the broker 103 no longer wishes to trade at that price, the broker 103 may reject the order 390; otherwise, it may accept/execute the order 380.

Figure 4B:
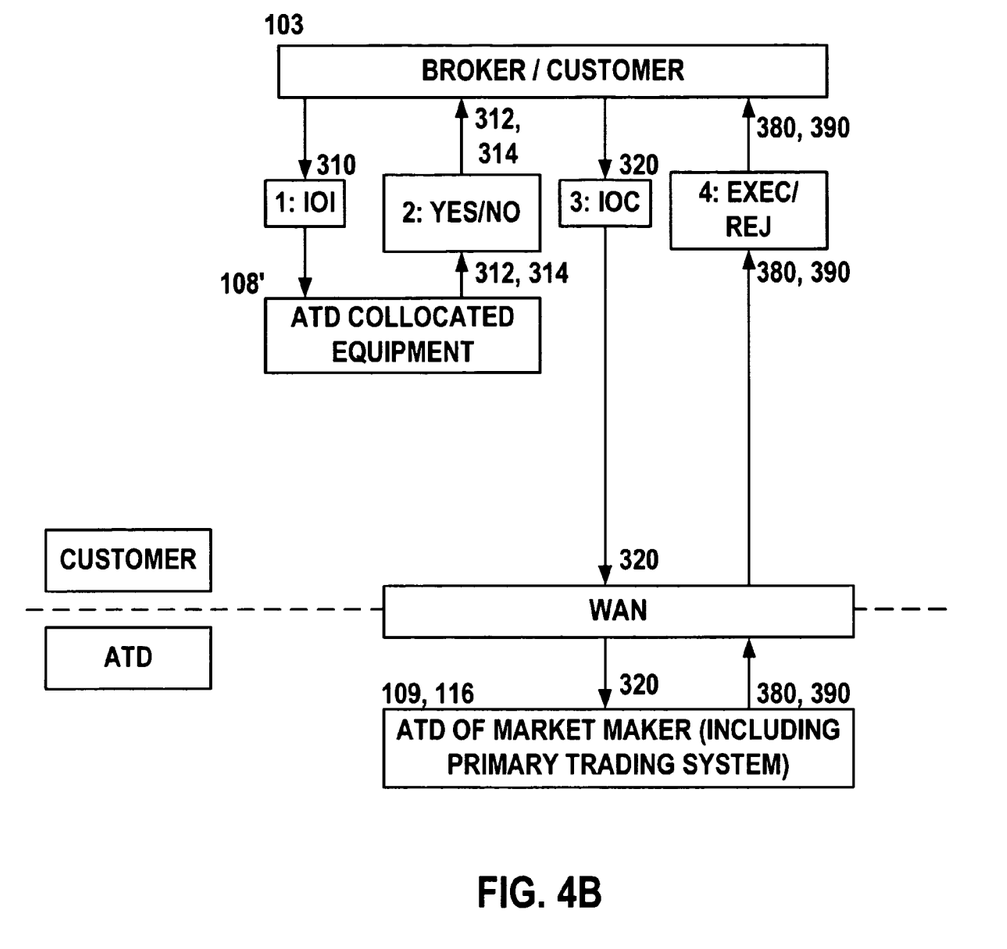
FIG. 4B is a CTCI-High level diagram that schematically shows the securities broker IOC version of the method of an embodiment of the present invention.

FIG. 4B schematically depicts an implementation similar to that shown in FIG. 4A, with the exception that the broker 2 103 IOI 310 is responded to solely with an IOI accept 314 or reject 312, and then the broker 103 responds with the actual order IOC 320 that is accepted 380 or rejected 390 (unlikely) by the market maker 109.

Figure 4C:
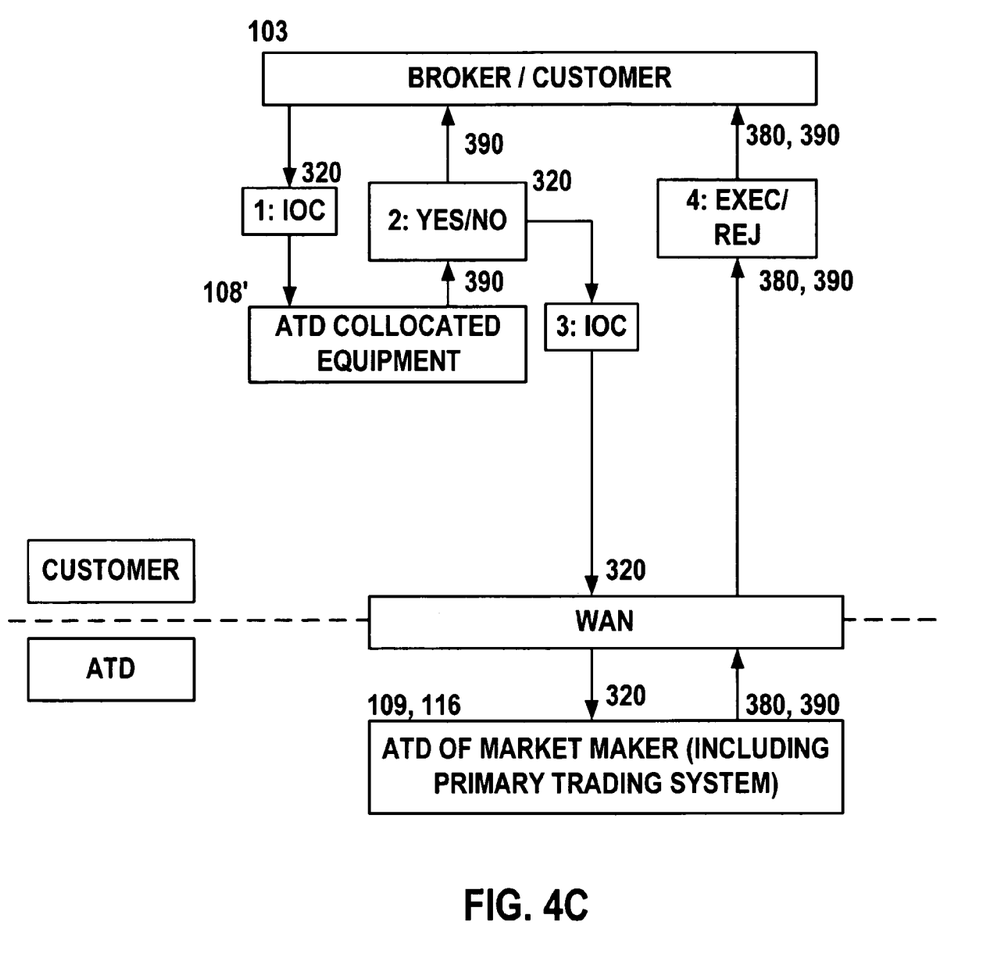
FIG. 4C is a CTCI-High level diagram that schematically shows the pure IOC version of the method of an embodiment of the present invention.

FIG. 4C illustrates the embodiment discussed above in which the broker 103 initially sends the IOC order 320 itself to the server 108', in which case a rejection of the order 390 can be initiated immediately or the order can be passed through to the market maker 109 where it may then be accepted 380.

It should be noted that the use of an IOC 320 would theoretically require no changes to the transactional structure used by the broker's systems 110. The IOI 310 transaction could be constructed very similar to the IOC 320 transaction, perhaps distinguished by a flag or other characteristic, but could also contain additional relevant data fields.

Figure 4D:
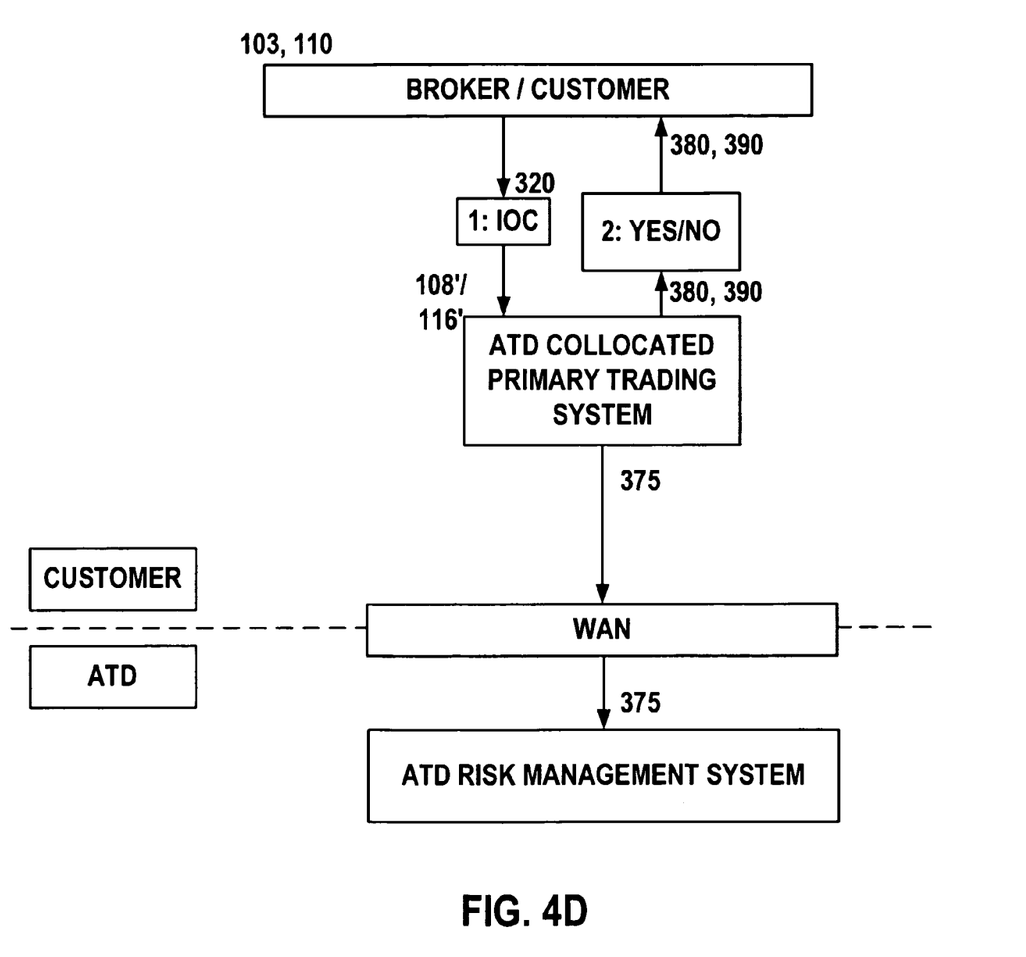
FIG. 4D is a CTCI-High level diagram that schematically shows the transaction flow when all elements except the market maker's risk management system are collocated with the broker's system.

Finally, FIG. 4D illustrates the flow for the configuration illustrated in FIG. 2C, in which everything except the ATD risk management system 375 is collocated with the broker's system 110. In this embodiment, 1:) an order IOC 320 is sent to the collocated primary trading system 108', 116', which then provides 2:) either an order confirmation 380 or an order rejection 390 to the broker's system 110. The only information that is directed out of the broker's 103 network is information related to inventory management 375.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

| | |
|---|---|
| 103 | security broker |
| 104 | price engine |
| 104.1 | pricing engine input |
| 104.2 | pricing engine algorithms |
| 104.3 | pricing data output |
| 104' | collocated price engine |
| 105 | pricing input-price engine data links |
| 106 | price engine-anonymous server communication link |
| 107 | pricing inputs |
| 108 | anonymous server |
| 108.1 | pricing data input |
| 108' | collocated anonymous server |
| 109 | market maker |
| 110 | security broker's system |
| 112 | broker system-anonymous server communication link |
| 114 | broker system-primary trading system communication link |
| 116 | primary trading system |
| 116' | collocated primary trading system |
| 117 | risk management system |
| 118 | communication link |
| 120 | communication link |
| 130 | pricing data database |
| Process | |
| 150-162 | process steps |
| Transactions | |
| 310, IOI | indication of interest ("quasi-order") |
| 312 | rejection of IOI |
| 314 | acceptance of IOI (acceptance of "quasi-order"; conditional acceptance of "offer") |
| 320, IOC | order (generally), or possibly fill-immediately-or-cancel ("fill-or-kill") order security pricing data |
| 330 | |
| 332 | counter offer pricing request |

-continued

TABLE OF REFERENCE CHARACTERS

| | |
|---|---|
| 334 | counter offer pricing data |
| 336 | market & pricing data |
| 352 | counter offer transaction |
| 370 | copy of order |
| 375 | inventory management message |
| 380 | order confirmation, acceptance |
| 390 | order rejection |
| Abbreviations | |
| ATD | automated trading desk |
| ATS | automated trading systems |
| CTCI | computer-to-computer interface |
| DP | decision point |
| ECN | electronic communication networks |
| LAN | local area network |
| WAN | wide area network |

What is claimed is:

1. A method for facilitating automated securities trading comprising the steps of:

anonymously communicating, by a system of a second party, to an anonymous server of a first party the second party's price and quantity of a security for which the second party is interested in trading;

receiving, by the anonymous server, market data from a pricing input;

generating, by the anonymous server, a predetermined range of a price and a quantity, based on the received market data, at which the first party is willing to trade the security;

comparing, by the anonymous server, the second party's price and quantity with the predetermined range of the price and quantity generated by the anonymous server;

when the second party's price and quantity is within the predetermined range of the price and quantity generated by the anonymous server, then converting, by the anonymous server, the second party's price and quantity into an order for the security, and informing, by the anonymous server, the second party's system of conversion of its price and quantity to the order for the security;

receiving, by the anonymous server, from the second party's system a selection of an option of the second party for communicating the order to a primary trading system and based upon the option selected:

1) directly communicating, by the anonymous server, the order to the primary trading system of the first party for execution, or 2) waiting for the second party's system to communicate the order to the primary trading system of the first party; and executing the order by the primary trading system of the first party according to the second party's option when the order is within the predetermined range established by the first party.

2. The method of claim 1, wherein the first party is a securities trader and the second party is a broker.

3. The method of claim 1, further comprising:

rejecting the second party's pricing and quantity communication if the quantity and price of interest to the second party is outside of the predetermined range of the and quantity generated by the anonymous server.

4. The method of claim 3, further comprising, upon rejection of the second party's communication of the quantity and price:

generating and communicating, by the anonymous sewer, a counter offer to the second party.

5. The method of claim 1, further comprising automatically communicating an order (IOC) or indication of interest (IOI) from the second party to the first party to trade the security by an automated system of the second party connected to the anonymous server, wherein the anonymous server initially preserves the identity of the second party.

6. The method of claim 5, further comprising responding, by the first party, to the order or IOI by at least one of: 1) executing the order and indicating acceptance of the order to the second party; 2) rejecting the order or IOI; and 3) accepting the IOI.

7. The method of claim 6, wherein:
the price and quantity of the first party is posted by an automated pricing data generation system, and the order or IOI communicated to the first party is acted upon by a primary trading system of the first party.

8. The method of claim 7, further comprising communicating between the automated price data generation system and the anonymous server.

9. The method of claim 7, further comprising collocating the automated price data generation system with the second party's automated system.

10. The method of claim 6, wherein:
the responding comprises a primary trading system of the first party initiating an order with the automated system; and the automated system responds to the initiated order by either accepting or rejecting the order.

11. The method of claim 5, wherein:
the anonymous server and the automated system are electronically in communication, and
wherein the server permanently maintains anonymity of the second party from the first party if the order or IOI is not accepted.

12. The method of claim 5, wherein:
the automated system initiates an order with a primary trading system of the first party; and
the primary trading system responds to the initiated order by either accepting or rejecting the order.

13. The method of claim 5, further comprising collocating the anonymous server with the second party's automated system.

14. The method of claim 5, wherein:
the pricing information of the first party is posted by an automated pricing data generation system;
the order or IOI communicated to the first party is acted upon by a primary trading system of the first party;
the method further comprising:
collocating the anonymous server with the second party's automated system;
collocating the automated price data generation system with the second party's automated system; and
collocating the primary trading system with the second party's automated system.

15. The method of claim 14, further comprising sending information comprising inventory management data from the collocated primary trading system a market maker's risk management system.

16. The method of claim 5, further comprising:
providing the pricing information of the first party by an automated pricing data generation system; and
acting upon the order or IOI communicated to the first party by the primary trading system of the first party.

17. The method of claim 5, further comprising providing the price and quantity of the first party to the second party upon the automatic communication of the order or IOI from the second party.

* * * * *

UNITED STATES PATENT AND TRADEMARK OFFICE
CERTIFICATE OF CORRECTION

| | |
|---|---|
| PATENT NO. | : 7,606,759 B2 |
| APPLICATION NO. | : 11/434942 |
| DATED | : October 20, 2009 |
| INVENTOR(S) | : Steve Swanson et al. |

It is certified that error appears in the above-identified patent and that said Letters Patent is hereby corrected as shown below:

IN THE CLAIMS SECTION -

In Column 14, Line 63, please change "party is outside of the predetermined range of the and" to -- party is outside of the predetermined range of the price and --

In Column 15, Line 1, please change "generating and communicating, by the anonymous sewer, a" to -- generating and communicating, by the anonymous server, a --

Signed and Sealed this

Fifth Day of January, 2010

David J. Kappos
*Director of the United States Patent and Trademark Office*